United States Patent [19]

Schimoler

[11] 3,981,275

[45] Sept. 21, 1976

[54] DOG GROOMING TOOL

[76] Inventor: Louis C. Schimoler, 1639 Cedar Swamp Road, Brookville, Glen Head PO, N.Y. 11545

[22] Filed: June 20, 1975

[21] Appl. No.: 588,622

[52] U.S. Cl. .............................. 119/83; 30/272 A
[51] Int. Cl.² ....................................... A01K 13/00
[58] Field of Search .................. 119/83, 85, 87, 88; 30/272 A, 304, 200, 233, 247, 30

[56] References Cited
UNITED STATES PATENTS

| | | | |
|---|---|---|---|
| 3,189,997 | 6/1965 | Mount | 30/247 |
| 3,406,730 | 10/1968 | Mantelet | 30/272 A |
| 3,919,769 | 11/1975 | Horn | 30/30 |

Primary Examiner—Louis G. Mancene
Assistant Examiner—Peter K. Skiff
Attorney, Agent, or Firm—Bruno P. Struzzi

[57] ABSTRACT

A dog grooming tool comprising electric powered knives and a comb member, having an elongated housing enclosing a reciprocating drive mechanism, said comb member extending therefrom and having a plurality of teeth members, said teeth being grooved, said grooved teeth members being adapted to shield and carry in sliding contact a plurality of counter-reciprocating tapered blades.

5 Claims, 6 Drawing Figures

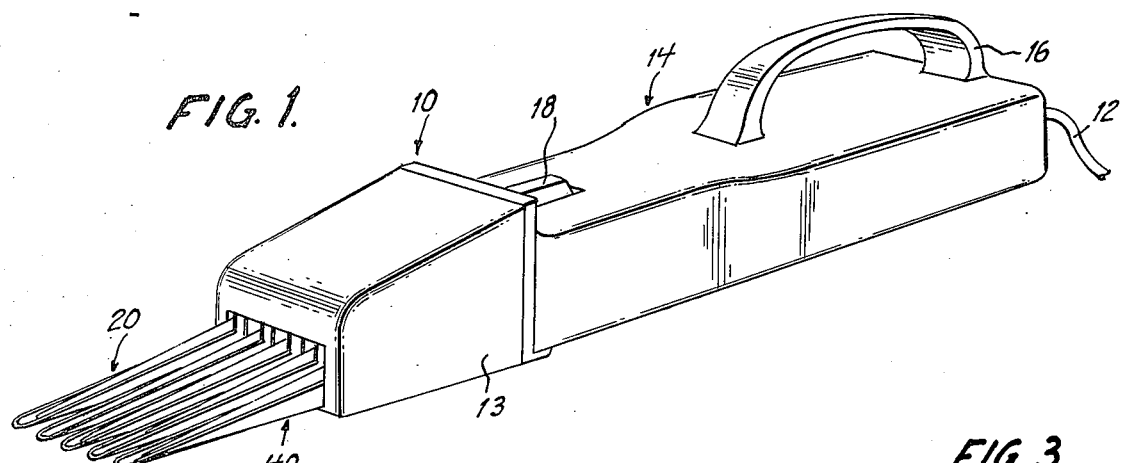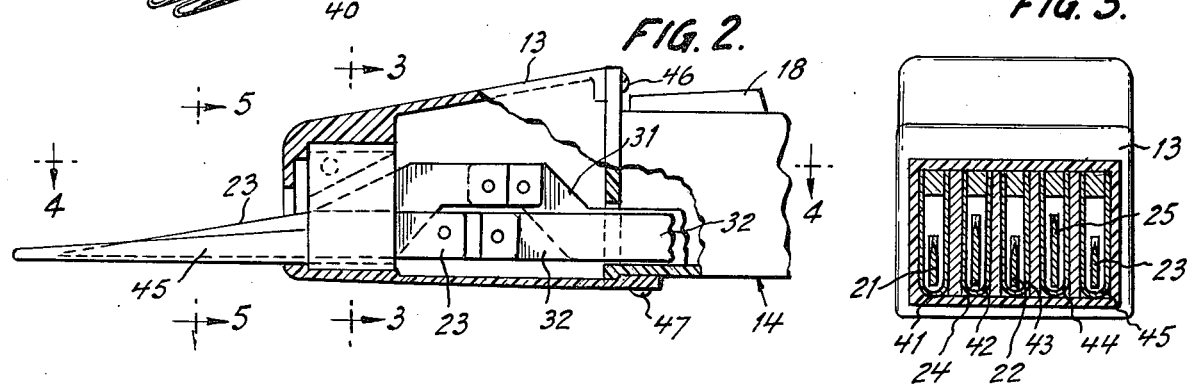

DOG GROOMING TOOL

BACKGROUND OF THE INVENTION

This invention relates to power operated blades or knives for cutting hair from animals, and more particularly combining a power operated knife with a comb member to facilitate the grooming of dogs with long hair.

In grooming dogs with long hair, particularly English Sheep dogs, Afgans and collies, the hair becomes matted and tangled. This causes great difficulty to the groomer in combing the dog and often inflicts great pain and discomfort to the dog during the grooming operation. The dog groomer must spend much time and effort in trying to comb out the mats of hair without injuring the skin of the animal. Often, difficult mats must be cut manually by scissors. In certain cases, the grooming of one dog can take as long as 3-4 hours.

Accordingly, it is a principal object of this invention to provide a grooming tool adapted to both comb the hair of the dog and split mats in said hair while at the same time avoiding undue cutting of said hair.

Another object of this invention is to provide a grooming tool having a plurality of blades which can easily be replaced and adjusted. The blades may be sharpened by hand, if desired, or new blades can be easily replaced.

Still another object of this invention is to provide a grooming tool which will not disturb or hurt the dog during the grooming operation while significantly saving the time required to groom the dog.

SUMMARY OF THE INVENTION

It has been found that an improved dog grooming device can be produced by combining the features of an electric cutter with the features of a comb. Conventional electric cutters having a reciprocating drive mechanism, can be improved by providing the drive mechanism with a plurality of tapered cutting blades adapted to counter-reciprocate in a plurality of corresponding grooved teeth members of a comb which extends from the housing.

THE DRAWINGS

FIG. 1. is a perspective view showing the dog grooming device of the present invention in the form of a power operated cutter and comb.

FIG. 2. is a side elevational view of the power operated cutter and comb with a portion of the elongated housing cut away to reveal the internal construction of the blades, and their connection to the reciprocating members.

FIG. 3. is a cross-sectional view of the power operated cutter and comb taken along line 3—3 of FIG. 2.

FIG. 4. is a top planned view showing the plurality of cutting blades and their connection to their reciprocating members.

FIG. 5. is a cross-sectional view of the power operated cutter and comb taken along line 5—5 of FIG. 2.

FIG. 6. is an enlarged perspective view of the reciprocating knife blades of the invention.

DETAILED DESCRIPTION OF THE DRAWINGS

Referring now to the drawings, FIG. 1. shows the power operated dog grooming tool generally denoted by reference 10. as being connected to an AC source of electrical power through electric conduit 12. The grooming tool includes an axially elongated housing assembly generally referred to by reference 14, having a handle, 16, and an off-on switch, 18. The housing 14 encloses a rearwardly positioned electric motor (not shown), a conventional geared power transmissiong (also not shown) for converting the rotary motion of the electric motor to a reciprocating motion which is transmitted by rods 31 and 32 (shown in FIGS. 2, 4 and 6). The forward portion of the housing, 14, has a comb member, 40, which extends longitudinally from the housing. The comb member has longitudinal grooved teeth members which cooperate to enclose a plurality of tapered cutting blades, 20, which counter-reciprocate.

As shown in FIGS. 2 through 6, the blade assembly, 20, includes a series of tapered blades, 21–25 having a cutting edge portion, 51–55, and a back edge portion, 61–65. The longitudinal cutting edge portions 51–55 of the blades converge toward each other from an enlarged end portion, 71–75, toward a smaller end portion 81–85. The removable blades are mounted in parallel space relation to the longitudinal axis of the housing assembly by means of fasteners 21a–25a, which secure the enlarged end portions 81–85, to the reciprocating members, 31 and 32 by means of cross members 28 and 29.

The comb member 40, having grooved teeth, 41–45, extends from the forward portion of the housing 13, which is removably connected to the rest of the housing at points 46 and 47. The longitudinal grooved teeth, 41–45, are adapted to carry the reciprocating blades 21–25, in a slidable relationship. The comb and teeth are arranged to serve as a shield and cooperate with the reciprocating blade in a protective relation to a major portion thereof, exposing only the cutting edges, 81–85 above the upper edges of one side of the blade assembly. The comb member extends below the reciprocating blade members to enclose the back edge portions of all the blades and will thus guide the linear reciprocating movement of the blade and serve to maintain a sliding contact with the counter-reciprocating blades. The comb member will be operative to comb the hair of the dog, and at the same time, protect the skin from the tapered cutting edges 81–85 which serve to split matted and tangled hairs. Cutting of dog hair during this operation with the grooming tool of this invention is thus avoided and minimized while reducing the grooming time to a half or a third of that presently required. The mounting of the comb member outside of the housing assembly will also permit it to be dismantled in order to facilitate replacement of the blade members 21–25.

Although FIGS. 1–6 only show one of the blades 21–25 reciprocating in each of the grooved teeth members 41–45 it is understood that the grooming tool of this invention contemplates the use of dual counter-reciprocating blades in each of the grooved teeth 41–45. In such case, the cross-members 28 and 29 would each have five corresponding blades thus providing five pairs of blades, each pair adapted to reciprocate within each of the corresponding grooved teeth 41–45.

Similarly, although not shown, an upper protective shield member can be provided extending from the top of the housing to protect both the dog and the dog groomer from the cutting edge of reciprocating blades 21–25.

From the foregoing description, the construction, assembly, maintenance and utility of the dog grooming tool of the present invention, will be apparent. In use, the tool may be manipulated like a manual comb and brush because of the particular shape of the elongated housing and handle portion. The projection of a series of cutting blades, laterally spaced from and on the same side as the longitudinal axis of the handle cooperates with the housing assembly to accommodate manipulation of the tool in bringing the blade into a proper position for splitting the mats of dogs hair while reducing the cutting action to a minimum. The stationary grooved teeth of the comb may be utilized as a manual comb in erecting the hair of the dog as the reciprocating movement imparted to the movable blades splits the matted and tangled hair. This is the essence of the invention; the combination of reciprocating knives within grooved teeth of a comb in order to save time, effort and avoid pain to the dog. Maintenance of the tool is facilitated because of the ease with which the reciprocating blades may be replaced, and the reciprocating mechanism adjusted so as to obtain proper reciprocating stroke for the comb and cutting operation. Toward this end, the forward housing section is removable so as to enable removal of the blades.

As the result of the foregoing features of the dog grooming tool, the skills developed by dog groomers through the use of manual scissors and comb in cutting long hair which is matted and tangled is avoided. Also, the fatique that develops through prolonged use of a manual comb scissors is avoided.

The foregoing is considered illustrative, only, of the main principles of the invention. Many modifications and changes will occur to those skilled with grooming tools. Thus it is not desired to limit this invention to the exact construction and operation shown. Accordingly, all suitable modifications and equivalents may be resorted to while still falling within the scope of the invention as claimed.

What is claimed is:

1. A power operated grooming tool for splitting matted hair in aimals while minimizing the cutting of said hair comprising an elongated housing having a longitudinal axis, a forward portion and a rearward portion; means defining an opening in the forward portion of said housing; an electric motor in said rearward portion connected to a source of power; a reciprocating drive mechanism in said forward portion of said housing connected to said motor; an elongated comb member extending from the forward portion of said housing having a plurality of grooved teeth members, said grooved teeth being adapted to partially enclose and guide a series of reciprocating blades, said blades having cutting edges exposed above the grooved teeth members, the blades being operatively connected to the drive mechanism in a counter-reciprocating relationship along a common axis in cooperation with the teeth members of the comb.

2. The grooming tool of claim 1 wherein the reciprocating blades have their cutting edge tapered.

3. The grooming tool of claim 2 wherein the blades have a flat inner side and a tapered outer side face, said inner face lying in a common plane and being held in sliding contact by grooved teeth in the comb member, the cutting edges of said reciprocating blade being in close proximity to one another, each cutting edge being a mirror image of the other.

4. The grooming tool of claim 3 wherein a single blade reciprocates in each grooved tooth of the comb.

5. The grooming tool of claim 4 wherein a pair of blades are counter-reciprocating in each grooved tooth of the comb.

* * * * *